United States Patent
Hickner et al.

[11] 3,746,402
[45] July 17, 1973

[54] REGULATOR FOR ADAPTIVE BRAKING SYSTEM

[75] Inventors: George B. Hickner; Richard T. Hendrickson, both of South Bend, Ind.

[73] Assignee: The Bendix Corporation, South Bend, Ind.

[22] Filed: June 29, 1972

[21] Appl. No.: 267,321

[52] U.S. Cl............................ 303/21 F, 188/181 A
[51] Int. Cl............................................... B60t 8/00
[58] Field of Search................ 303/21 F; 188/181 A

[56] References Cited
UNITED STATES PATENTS
3,672,731   6/1972   Koivunen .................... 303/21 F
3,674,320   7/1972   Howard et al. .............. 188/181 A X Primary Examiner—Allen N. Knowles
Assistant Examiner—Gene A. Church
Attorney—Ken C. Decker et al.

[57] ABSTRACT

An adaptive braking system is disclosed which includes the usual modulator operated by a fluid motor which is responsive to an output signal from an electronic control unit to relieve braking pressure in the vehicle's brakes. The system further includes a valve which is responsive to the fluid pressure level actuating the vehicle's brakes to vary the rate at which the braking pressure communicated to the vehicle's brakes is relieved by controlling the rate at which fluid pressure is communicated to the fluid motor which operates the modulator. This feature provides a relatively low decay rate when the braking pressure communicated to the brake of the vehicle at the time the modulator is actuated is high, and a much faster decay rate when the pressure level communicated to the brakes of the vehicle upon actuation of the modulator is relatively low. Since relatively high fluid pressures will have been communicated to the vehicle's brakes upon actuation of the modulator when the vehicle is traversing a surface having a relatively high coefficient of friction, and much lower fluid pressure levels will be communicated to the vehicle's brakes at the time the modulator is actuated when the vehicle is traversing low coefficient surfaces, the adaptive braking system disclosed herein will provide a high decay rate on low coefficient surfaces and a much lower decay rate on high coefficient surfaces.

12 Claims, 1 Drawing Figure

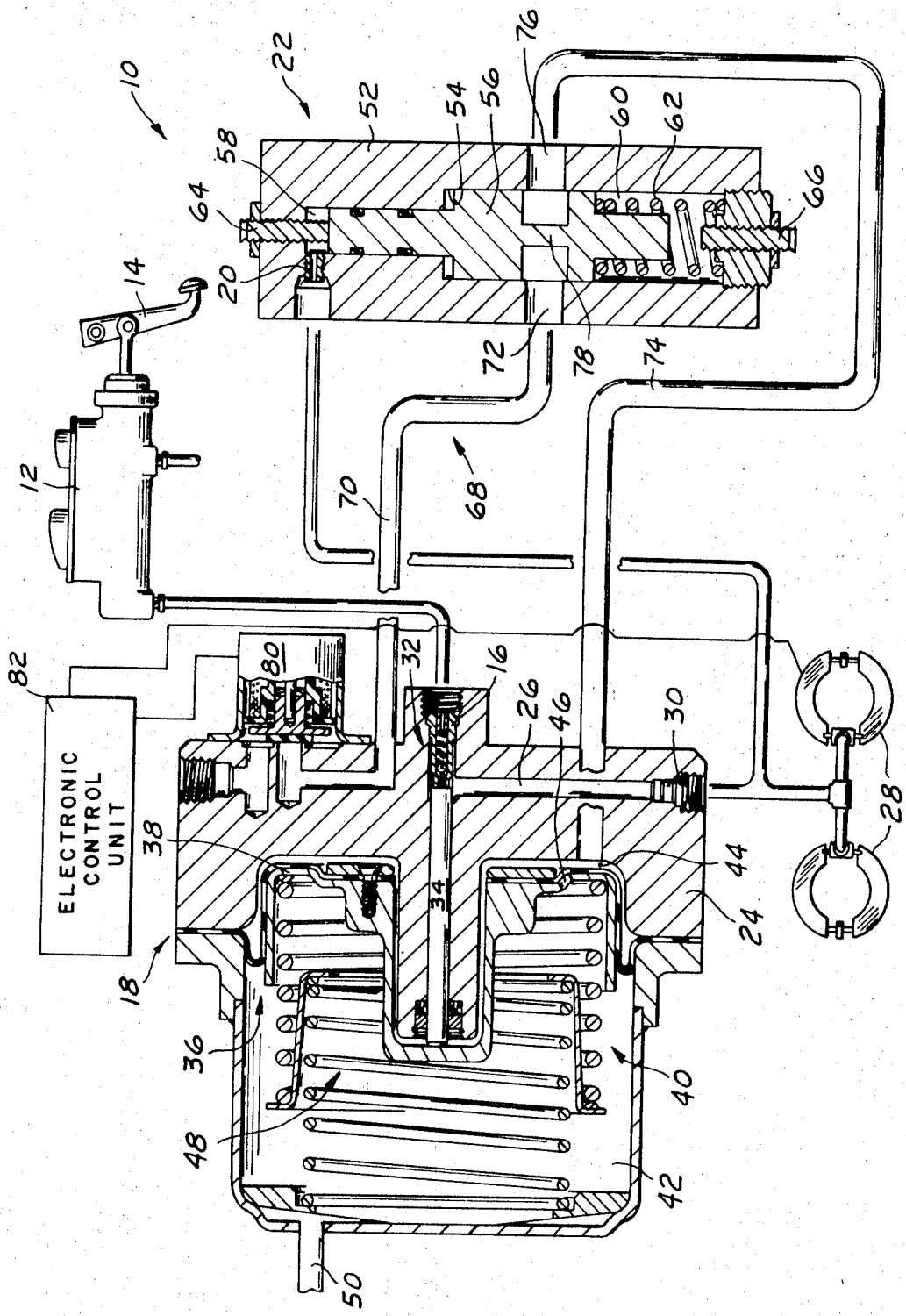

REGULATOR FOR ADAPTIVE BRAKING SYSTEM

BACKGROUND OF THE INVENTION

This invention relates to adaptive braking systems for automotive vehicles.

It is very desirable to provide multiple decay rates in an automotive adaptive braking system, and to vary the decay rate used depending upon the coefficient of friction of the road surface upon which the vehicle is traveling. For example, it is desirable to provide a very fast decay rate when braking on low coefficient surfaces to prevent wheel lockup, and to provide a much lower decay rate upon braking on high coefficient surfaces, to attain maximum brake effectiveness. Heretofore, multiple decay rates have been provided only by providing multiple electrically operated valves or by providing proportional valves which actuate the modulator. Of course, providing these valves is very expensive. Therefore, it is desirable to provide an inexpensive way of attaining multiple decay rates in an adaptive braking system.

SUMMARY OF THE INVENTION

Therefore, an important object of our invention is to provide an adaptive braking system in which the brake pressure decay is varied according to the coefficient of friction upon which the vehicle is traveling.

Another important object of our invention is to provide a valve which is responsive to the fluid pressure level communicated to the brakes of the vehicle to adjust the decay rate of the brake pressure modulator accordingly.

A still further object of our invention is to provide an adaptive braking system having a relatively high decay rate when the vehicle is operating on a low coefficient surface and consequently the fluid pressure level communicated to the vehicle's brakes is quite low, and to provide a lower decay rate when the vehicle is operating on a higher coefficient surface and the pressure level communicated to the vehicle's brakes is relatively high.

DESCRIPTION OF THE DRAWINGS

The sole FIGURE of the drawing is a schematic illustration of an adaptive braking system for an automotive vehicle made pursuant to the teachings of our present invention.

DETAILED DESCRIPTION

Referring now to the drawing, an adaptive braking system generally indicated by the numeral 10 includes a standard automotive master cylinder 12 which is actuated by the usual brake pedal 14 mounted in the vehicle operator's compartment. The outlet port of the master cylinder 12 is communicated to the inlet port 16 of an adaptive braking system modulator generally indicated by the numeral 18 and to the inlet port 20 of a decay rate control valve generally indicated by the numeral 22. The modulator 18 includes a housing 24 defining a variable volume compartment 26 therewithin which is communicated to the outlet port of the master cylinder 12 through the inlet port 16 and to the brakes 28 of the vehicle through an outlet port 30. A check valve generally indicated by the numeral 32 is mounted within the chamber 26 and is controlled by a plunger 34. It should be noted that movement of the plunger 34 to the left viewing the drawing will first permit the check valve 32 to close, to isolate the master cylinder 12 from the compartment 26, and further movement of the plunger 34 to the left will increase the volume of the chamber 26, to permit the braking pressure communicated to the brakes 28 to decay.

Movement of the plunger 34 is controlled by a fluid motor generally indicated by the numeral 36, and which includes a piston 38 slidably mounted in a chamber 40 defined within the housing 24. The piston 38 divides the chamber 40 into a first section 42 and a second section 44. An orifice 46 extends through the piston 38 and permits limited fluid communication between the chamber 42 and the chamber 44 so that after a sufficiently long time the fluid pressure level in the chambers 42 and 44 will become equal. The piston 38 is urged towards its rightward-most position illustrated in the drawing by resilient means generally indicated by the numeral 48. It will be noted that in the position illustrated in the drawing, the piston 38 maintains the plunger 34 in a position maintaining the check valve 32 open. The chamber 40 is communicated to a vacuum source, such as the engine manifold vacuum, by an inlet port 50.

The decay rate control valve 22 includes a housing 52 defining a bore 54 therewithin in which a piston 56 reciprocates. One end of the piston 56 cooperates with a corresponding end of the housing 52 to define a chamber 58 therebetween which is communicated to the outlet port of the modulator 18 through the inlet port 20. The opposite end of the piston 56 cooperates with the opposite end of the housing 52 to define another chamber 60 therebetween in which a spring 62 is housed which yieldably urges the piston 56 into engagement with a manually adjustable stop member 64 which extends into the chamber 58 to limit movement of the piston 56 toward the corresponding end of the housing. A second manually adjustable stop means 66 extends into the other end of the housing, to limit movement of the piston 56 away from the stop means 64.

Referring again to the modulator 18, section 44 of chamber 40 is communicated to the atmosphere by passage means generally indicated by the numeral 68 and which includes a first branch 70 communicating the atmosphere with an inlet port 72 on the housing 52. A second branch 74 of passage means 68 communicates an outlet port 76 on the housing 52 with the section 44 of chamber 40. The piston 56 is provided with a reduced diameter portion 78 so that, when the piston 56 is disposed in the position illustrated in the drawing, substantially uninhibited fluid communication will be permitted between the inlet port 72 and the outlet port 76. However, as the piston 56 moves toward the stop 66, it will become apparent to those skilled in the art that fluid communication between the inlet port 72 and the outlet port 76 will become progressively restricted, to thereby restrict fluid communication through the passage 68 into the section 44 of chamber 40. Fluid communication through the passage means 68 is controlled by a normally closed electrically operated solenoid valve generally indicated by the numeral 80. The valve 80 is of completely conventional construction well known to those skilled in the art and will not be described in detail herein. Valve 80 is responsive to an output signal produced by an electronic control unit generally indicated by the numeral 82, also of conventional construction, which is responsive to the wheel speed upon which the brakes 28 control to measure wheel deceleration and produce the output signal actuating the valve 80 when the deceleration signal attains a predetermined level. The electronic control unit 82 preferably includes circuitry including logic circuitry made pursuant to the teachings of U.S. Pat. No. 3,494,671, owned by the assignee of the present invention and incorporated herein by reference.

MODE OF OPERATION

As is well known to those skilled in the art, the brake actuating pressure communicated to the brake 28 which is sufficient to cause the wheels controlled by the latter to decelerate to a level sufficient to actuate the valve 80 will be much higher on high coefficient surfaces than on low coefficient surfaces. Assuming that the vehicle on which the adaptive braking system 10 is mounted is traversing a low coefficient surface when the electronic control unit 82 senses the critical wheel deceleration to actuate the solenoid valve 80, the end of the piston 56 will remain adjacent the stop 64 since the relatively low fluid pressure level communicated into the chamber 58 from the master cylinder 12 will be insufficient to overcome the resiliency of the spring 62 to any appreciable extent. Therefore, the recessed portion 78 of the piston 56 will remain in a position illustrated in the drawing to permit substantially uninhibited fluid communication between the inlet port 72 and the outlet port 76. Therefore, when the solenoid valve 80 is actuated, atmospheric air is communicated into section 44 of chamber 40 at a relatively rapid rate. The high pressure fluid in the section 44 creates a pressure differential across the piston 38, thereby urging the latter to the left, viewing the FIGURE. Movement of the piston 38 also permits the plunger 34 to move to the left at a quite rapid rate, first closing the valve means 32 and then rapidly increasing volume of the compartment 26 to permit a rapid pressure decay of the braking pressure communicated to the brakes 28. After the adaptive braking cycle is terminated thereby reclosing the valve 80, the high pressure air in the section 44 of chamber 40 bleeds into the section 42 of the latter, so that after a sufficiently long time, the resilient means 48 will return the piston 38, and therefore, the plunger 34, to the position illustrated in the drawing.

Assume now that the vehicle is traversing a high coefficient surface when the brakes 28 are applied with sufficient force to cause the wheels controlled by them to decelerate past the critical level causing actuation of the solenoid valve 80. When this occurs, the piston 56 will be forced away from the stop 64, since the relatively high fluid pressure level required to decelerate the wheels on a high coefficient surface will also be communicated into the chamber 58. As will become apparent to those skilled in the art, the larger diameter portions of the piston 56, which also engage the wall of the bore 54, will restrict fluid communication between the inlet port 72 and the outlet port 76 by reducing the area of the passage through the housing 52 communicating ports 72 and 76 thereby causing the higher pressure atmospheric air to be communicated into section 44 of chamber 40 at a relatively slow rate. Therefore, the piston 38 moves leftwardly viewing the Figures at a relatively slow rate, to cause the plunger 34 to increase the volume of chamber 26 at a relatively slow rate to provide a relatively low rate of pressure decay of the brakes 28. Therefore, when the vehicle is traversing a high coefficient surface the decay rate is much lower than when the vehicle is traveling across a lower coefficient surface.

We claim:
1. In a vehicle having a wheel and a brake controlling said wheel, an adaptive braking system comprising:
   brake pressure developing means for generating braking pressure for actuating said brake;
   controller means responsive to an incipient skidding condition of said wheel and generating an output signal in response to said incipient skidding condition;
   modulating means responsive to said output signal for effecting a reduction in the braking pressure communicated to said brake; and
   means responsive to the magnitude of the braking pressure actuating said brake to control the rate at which the braking pressure communicated to said brake is reduced.
2. The invention of claim 1:
   said last-mentioned means permitting said braking pressure to reduce at a progressively slower rate as the braking pressure actuating said brake is increased.
3. In a vehicle having a wheel and a brake controlling said wheel, an adaptive braking system comprising:
   brake pressure developing means for generating braking pressure for actuating said brake;
   controlling means responsive to an incipient skidding condition of said wheel and generating an output signal in response to said incipient skidding condition;
   modulating means responsive to said output signal for effecting a reduction in the braking pressure communicated to said brake;
   said modulating including a housing defining a compartment therewithin communicated to said brake pressure developing means and to said brake, a plunger slidably mounted in said compartment and movable to effect a change in volume of the latter, pressure differential responsive means operably connected to said plunger for moving the latter, and means responsive to said output signal for communicating a pressure differential across said pressure differential responsive means; and
   means responsive to the pressure level actuating said brake for controlling the rate at which said pressure differential is communicated across said pressure differential responsive means.
4. The invention of claim 3:
   said last-mentioned means decreasing the rate at which said pressure differential is communicated across said pressure differential responsive rate as the pressure actuating said brake is increased.
5. The invention of claim 3:
   said pressure differential responsive means including a first piston slidably mounted within said housing, said means responsive to said output signal communicating a higher fluid pressure level to one side of said first piston than the fluid pressure level communicated to the other side of the latter;
   said means responsive to the pressure level actuating said brake controlling the rate at which fluid pressure is communicated to said one side of said pressure differential responsive means.
6. The invention of claim 5:

said last-mentioned means decreasing the rate at which fluid pressure is communicated to said one side of said first piston as the pressure actuating said brake when said output signal is generated, is increased.

7. The invention of claim 3:

said modulating means including a housing defining a chamber therewithin, said pressure differential responsive means including a first piston slidably mounted in said chamber and defining a pair of fluid receiving cavities between opposite sides of the piston and corresponding ends of the housing, and passage means communicating one of said chambers with a fluid pressure level greater than that normally existing in said chambers, said means responsive to said output signal including electrically operated valve means controlling fluid communication through said passage means;

said means responsive to the pressure level actuating said brake being constructed and arranged to control the rate of fluid flow through said passage means.

8. The invention of claim 7:

said last-mentioned means being effective to vary the cross-sectional area of said passage means in response to the braking pressure actuating said brake.

9. The invention of claim 7:

each of said fluid receiving cavities being normally communicated to a vacuum source, said passage means communicating said one cavity with atmospheric pressure when said electrically operated valve means is opened.

10. The invention of claim 7:

said last-mentioned means including a section piston responsive to the braking pressure actuating said brake, said second piston controlling the rate of flow of fluid through said passage means, and resilient means yieldably urging said second piston to a position permitting unrestricted flow through passage means.

11. The invention of claim 7:

said last-mentioned means including a second piston responsive to the braking pressure actuating said brake, said second piston varying the cross-sectional flow area of said passage means in accordance with the pressure level actuating said brake, and resilient means yieldably urging said second piston to permitting unrestricted flow through said passage means.

12. The invention of claim 11:

said second piston decreasing said cross-sectional flow area as the braking pressure is increased.

* * * * *